United States Patent
BenHanokh et al.

(10) Patent No.: US 12,321,276 B2
(45) Date of Patent: Jun. 3, 2025

(54) PREFETCHING CACHED DATA FOR PREDICTED ACCESSES

(71) Applicant: Red Hat, Inc., Raleigh, NC (US)

(72) Inventors: Gabriel Zvi BenHanokh, Tel-Aviv (IL); Yehoshua Salomon, Kfar Saba (IL)

(73) Assignee: Red Hat, Inc., Raleigh, NC (US)

( * ) Notice: Subject to any disclaimer, the term of this patent is extended or adjusted under 35 U.S.C. 154(b) by 123 days.

(21) Appl. No.: 17/900,615

(22) Filed: Aug. 31, 2022

(65) Prior Publication Data

US 2024/0070079 A1 Feb. 29, 2024

(51) Int. Cl.
G06F 12/0862 (2016.01)

(52) U.S. Cl.
CPC .... G06F 12/0862 (2013.01); *G06F 2212/602* (2013.01)

(58) Field of Classification Search
CPC ........................ G06F 12/0862; G06F 2212/602
See application file for complete search history.

(56) References Cited

U.S. PATENT DOCUMENTS

| | | | |
|---|---|---|---|
| 6,766,441 B2 | 7/2004 | Sinharoy | |
| 7,313,654 B2 | 12/2007 | Zohar et al. | |
| 10,013,356 B2 | 7/2018 | Chou | |
| 10,084,877 B2 | 9/2018 | Hipsh et al. | |
| 10,346,360 B1 * | 7/2019 | Basov | G06F 16/182 |
| 10,884,938 B2 | 1/2021 | Harnik et al. | |
| 2002/0103778 A1* | 8/2002 | Saxena | G06F 16/9574 |
| 2016/0088072 A1* | 3/2016 | Likhtarov | H04L 67/1008 709/226 |
| 2017/0094004 A1* | 3/2017 | Barraclough | H04L 67/568 |
| 2019/0138451 A1* | 5/2019 | Alam | G06F 12/0862 |
| 2020/0349080 A1 | 11/2020 | Radi et al. | |
| 2021/0149805 A1* | 5/2021 | Pinho | G06F 12/0862 |

(Continued)

OTHER PUBLICATIONS

Peled, et al., "A Neural Network Prefetcher for Arbitrary Memory Access Patterns." ACM Trans. Archit. Code Optim., vol. 16, No. 4, Article 37, Publication date: Oct. 2019. 11 pages. https://dl.acm.org/doi/fullHtml/10.1145/3345000.

(Continued)

*Primary Examiner* — Prasith Thammavong
(74) *Attorney, Agent, or Firm* — Womble Bond Dickinson (US) LLP

(57) ABSTRACT

An example method may include identifying one or more requested data items requested by a client system, identifying, in view of one or more requested data items, a plurality of predicted data items and, for each predicted data item, a respective probability that the predicted data item will be requested by a subsequent access request, identifying a plurality of cacheable data items, where the cacheable data items comprise one or more of the predicted data items, wherein each cacheable data item comprises a predicted data item that satisfies caching criteria, wherein the caching criteria are evaluated in view of the respective probability that the predicted data item will be requested by a subsequent access request, and storing each of the plurality of cacheable data items in a cache memory of a respective storage server at which the cacheable data item is located.

20 Claims, 7 Drawing Sheets

(56) References Cited

U.S. PATENT DOCUMENTS

2022/0058132 A1\*  2/2022  Roberts .............. G06F 12/0862
2022/0374367 A1\* 11/2022  Fang ................. G06F 9/30043

OTHER PUBLICATIONS

Gill, et al., "AMP: Adaptive Multi-stream Prefetching in a Shared Cache." USENIX Association, FAST '07: 5th USENIX Conference on File and Storage Technologies. 14 Pages, retrieved from the internet: Aug. 31, 2022. https://www.usenix.org/legacy/event/fast07/tech/full_papers/gill/gill.pdf.

\* cited by examiner

PREFETCHING CACHED DATA FOR PREDICTED ACCESSES

TECHNICAL FIELD

The present disclosure is generally related to caching in computer systems, and more particularly, to prefetching cached data for predicted data accesses.

BACKGROUND

Modern computers often store data in a distributed storage system to enhance the access, redundancy, and capacity of data storage devices. The distributed storage system may include multiple storage nodes that function to store, organize, and provide access to data. The data may include user data generated by an application. The distributed storage system may include a server portion that manages the data and a client portion that provides access to the data. The client portion may include code (e.g., a client module) that enables a client device to access data of the distributed data store.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
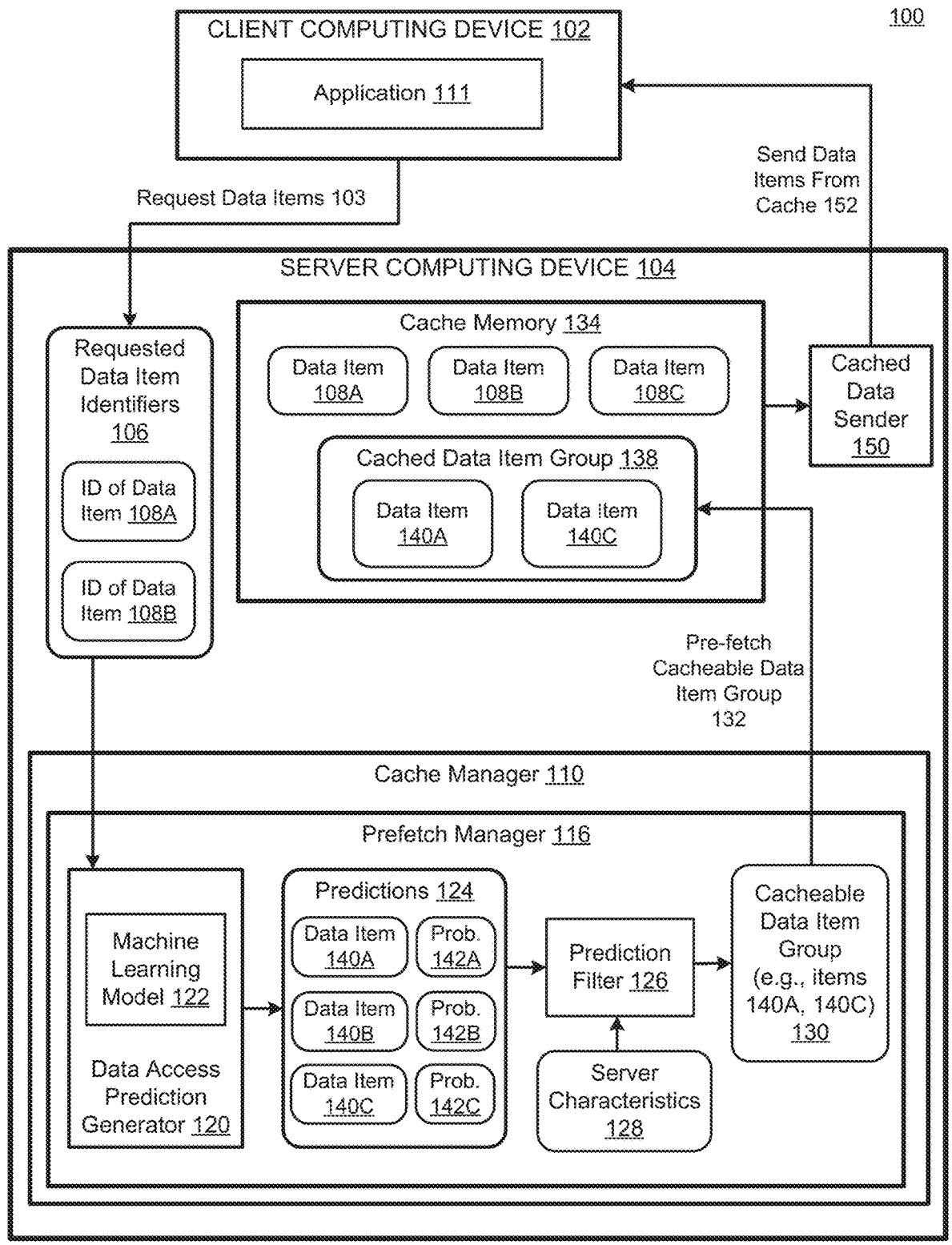
FIG. 1 depicts a high-level block diagram of an example computing system in which data items can be cached at a server, in accordance with one or more aspects of the present disclosure.

Described herein are systems and methods for prefetching cached data based on predicted accesses.

A storage server can provide access to a data store by receiving data access requests from clients, retrieving the requested data items from the data store, and sending the requested data items to the client. The storage server's performance, e.g., the delay between receiving a request and sending the requested data items to the client, can be improved by prefetching data items from the data store and storing the prefetched data items in a cache. The cache can be a memory or other type of storage from which the data items can be quickly retrieved. The cache ordinarily has substantially less storage capacity than the data store, however, so the storage system can identify data items are likely to be requested in the future, and prefetch the identified data items by loading and storing them into the cache. The storage system or an external prediction engine can identify the data items to be prefetched by predicting which data items will be requested. The storage system can then prefetch the predicted data items prior to receiving requests for them, or retain the predicted data items if they are already present in the cache.

The term "data item" herein shall refer to a unit of information, which can be, for example, a sequence of bytes of a specified length, an object of a specified type, a document, such as a web page, or other value. A data item can be identified by a data item identifier. A data item identifier can be information that identifies a particular data item, and can be used to retrieve the data item from a storage system. A data item identifier can be, for example, an object identifier or storage address that can be used to retrieve a corresponding object from a storage system or a file name.

In one example, a data item can be a file served by a file server, in which case the data item's identifier can be a URL of the file (e.g. abc.com/file.img). The file data item itself can be the content of the file, e.g., a video, disk image, or other data. Prefetching a file can involve loading the content of the file into a cache. In another example, a data item can be a disk block, in which case the data item's identifier can be a disk block number (e.g., block #1). The disk block data item itself can be the content of the disk block, e.g., a sequence of bytes. Prefetching a disk block can involve loading the content of the disk block into a cache.

The term "data set" herein shall refer to a sequence of one or more data items or a sequence of one or more data item identifiers. Thus, a data set can identify a sequence of data items without necessarily including the content of the data items. For example, a data set that specifies a sequence of two web pages can be represented as the URLs of the web pages (e.g. abc.com/page1.html, abc.com/page2.html). As another example, a data set can be a sequence of disk block identifiers (e.g., block #1, block #10, block #5) that identify particular disk blocks. The order of the data item identifiers in the data set corresponds to the order in which the identified data items are accessed.

The storage server can more efficiently retrieve data items if the retrieval can be performed during idle periods in which the server is not processing other requests, or in batches, since batching retrieval of data items for retrieval can improve throughput, for example. In one prefetching technique, the server can prefetch the data items in sequential order, e.g., by prefetching the next several blocks or kilobytes of a file. Sequential prefetching may be suitable for data sets that are sequential in nature, such as a video file, since the next several seconds can be prefetched and made available in cache memory prior to being requested by the client. For non-sequential data accesses, e.g., retrieving data sets such as files in a file server or web pages in a web server, the server can predict the data sets that are likely to be requested in the future.

Machine learning techniques can be used to predict future data accesses by identifying access order relationships between data sets. A machine learning model may be trained using training data that includes sequences of data items that represent past data accesses. As an example, if the training data specifies that data items A, B, and C, were read in sequence (e.g., in the order A, B, C), then a machine learning model trained on the training data can predict that if data items A and B are read in sequence at a later time, the next data item to be read is likely to be data item C.

A machine learning model can predict which of the data items is most likely to be accessed next, and the server may prefetch the predicted most likely next data item. However, the prediction may be incorrect, in which case prefetching the predicted data item can actually reduce performance, since the predicted data item is retrieved from storage but not used, and another retrieval operation is needed to retrieve the requested data item from the data store. Such incorrect prefetching can reduce the effectiveness of the cache, since the data that is actually accessed is not present in the cache and, is instead retrieved from the data store instead of the cache.

Aspects of the present disclosure address the above and other deficiencies by providing a cache management system that can generate multiple alternative predicted data items, each of which is associated with a respective access probability that represents a likelihood of the predicted data item being the next data item accessed by a server. The prediction can be made by a machine learning model that takes an access pattern as input, and identifies a group of predicted data items, each of which is predicted, with the respective probability, to be the next data item to be accessed subsequent to the access pattern. Thus, each predicted data item in the group can be one of group of alternatives for the next data item that is predicted to be accessed, and each alternative can be associated with a respective probability of actually being accessed. The access pattern used to generate the prediction can be a sequence of one or more data items accessed by the server, such as the data set most recently accessed by the server.

The cache management system can evaluate threshold caching criteria for each of the predicted data items in the group generated by the machine learning model to determine whether to prefetch the respective predicted data item into a cache memory of the server. The caching criteria can include probability criteria and/or server characteristic criteria. For example, if the access probability of a predicted data item satisfies the probability criteria, and the server characteristic criteria is also satisfied, then the predicted data item can be prefetched. The probability criteria can be satisfied if, for example, the predicted data item is one of a threshold number T of predicted data items having the highest respective access probabilities in a group of predicted data items. The server characteristic criteria can be satisfied if, for example, an amount of computational load at the server on which predicted data item is located is less than a predetermined load threshold.

When a predicted data item that is stored in a cache is accessed, e.g., requested by a client system, the other data items in the requested data item's group can be removed from the cache. Further, the machine learning model can be updated to reflect that the predicted data item was accessed, e.g., by updating the model's training based on an association between the predicted data item and another data item that was accessed prior to the predicted data item.

Different data items can be stored at different servers. For example, each server can have a respective persistent data store in which data items located at the server are stored. Upon identifying a group of predicted data items, the cache management system can cause each predicted data item to be cached at the respective server on which the predicted data item is located. For example, for each predicted data item, the cache management system can send a prefetch instruction to the respective server on which the predicted data item is located. The prefetch instruction can cause the respective server to load the predicted data item from persistent storage and store the predicted data item in a cache memory at the server. When one of the pre-cached data items is requested by a client, the cache management system can send a cache purge instruction to each server on which one of the other (alternative) predicted but non-requested data items in the group is located. The purge instruction can cause the server to delete the non-requested predicted data item from the server's cache memory.

The systems and methods described herein include technical improvements to caching technology in storage servers. In particular, aspects of the present disclosure may improve the efficiency of responding to requests for data in storage servers by prefetching multiple data items that are likely to be accessed. Prefetching multiple data items increases the likelihood that requested data items are in the cache. The prefetching can be subject to a threshold probability criterion and/or a threshold server load criterion, so that the amount of cache space, processor time, network bandwidth, or other system resources used to cache data items can be controlled, and the number of unnecessary prefetching operations can be reduced. For example, if the threshold criterion selects the predicted data items having the top-N probability values, then higher values of N can be specified to increase the amount of pre-caching, with a corresponding increase in the likelihood of cache hits, and a corresponding increase in resource usage. Similarly, lower values of N can be specified to decrease the amount of pre-caching, with a corresponding decrease in the likelihood of cache hits and a corresponding decrease in resource usage.

Various aspects of the above referenced methods and systems are described in details herein below by way of examples, rather than by way of limitation. The examples provided below discuss using machine learning models to predict data items that are likely to be requested, and selecting which of the predicted data items to prefetch. In other examples, any suitable technique can be used to identify data items that are likely to be requested. Further, although particular threshold criteria are used to determine whether to cache a predicted data item, and suitable threshold criteria can be used.

FIG. 1 depicts a high-level block diagram of an example computing system 100 in which data items 108, 140 can be cached at a server 104, in accordance with one or more aspects of the present disclosure. A client computing device 102 can request data items from a server computing device 104. For example, an application 111 running on client computing device 102 can send a request (arrow 103) specifying one or more data item identifiers that identify the requested data items. Each data item identifier can be, for example, an object identifier or storage address that can be used to retrieve a corresponding object from a storage server such as the server computing device 104. The server computing device 104 can retrieve each data item specified by the data item identifiers from storage, such as a cache memory 134 or, if the requested data item is not present in the cache memory 134, from a persistent storage device. The cache memory 134 can provide faster access times but lower storage capacity than the persistent storage. If the requested data item is present in the cache memory 134, the server computing device 104 can retrieve the data item from the cache memory 134 and send the data item to the client computing device 102 (arrow 152). The application 111 can receive and process the requested data. The cache memory 134 includes cached data items 108A, 108B, and 108C, as well as a cacheable data item group 138 that includes data items 140A and 140C. The cacheable data item group 138 is a group of prefetched data items that are predicted to be accessed subsequently to the requested data items 108, and is stored in the cache memory 134 by a prefetch manager 116, as described below.

The request for data items sent by the client computing device 102 (arrow 103) can specify one or more data requested item identifiers 106. The specified identifiers 106 can be an ordered sequence of identifiers, such as a sequence containing an identifier for data item 108A followed by an identifier for data item 108B. A cache manager 110 on the server computing device 104 can retrieve the requested data items from the cache memory 134 if the requested data items are present in the cache memory 134. The cache manager 110 can include a prefetch manager 116, which can identify data items that may be requested by client computing device 102 or other requesting device at a future time, and cause the identified data items to be loaded from persistent storage and stored in the cache memory 134. The prefetch manager 116 includes a data access prediction generator 120, which can use a machine learning model 122 or other prediction component to generate one or more predicted data items that may be requested subsequent to the data item(s) 108 identified in the current request for data items 103.

The data access prediction generator 120 can generate predictions 124 based on one or more requested data items 108, such as a sequence of data items 108A, 108B, 108C. The predictions 124 can identify a group of data items 140, each of which is predicted, with an associated probability, to be the next data item accessed by the server computing device 104. The next data item accessed can be, for example, a data item requested by the next request received by the server computing device 104. For example, the machine learning model 122 can generate three predicted data item identifiers 140A, 140B, 104C using the requested data items 108 as input. Each of the predicted data items can correspond to one of a group of predictions of which data item is expected to be requested subsequent to the requested data items 108. The data access prediction model 120 can generate the data access predictions 124 using input that includes a sequence of one or more data item identifiers 106, each of which identifies a data item 108 that has been accessed in the past (e.g., requested by the client or another server, or otherwise accessed by the server in the past). The machine learning model can be trained on historical access pattern data, which can be for particular applications 111. The access pattern data can include a relation between a sequence of one or more first data items ("D1") and a second data item ("D2"). The relation (D1, D2) indicates that data item D2 was accessed subsequently to the one or more data items in the sequence D1. As such, if a data item (or sequence of data items) D1 is accessed, and D2 is the next data item accessed after the last data item in the sequence D1, then a prediction can be made that if D1 is accessed again, then D2 will be the next data item accessed, with a probability determined by the machine learning model 122. The probability may increase with the number of times the access pattern (D1, D2) occurs, for example.

The historical access pattern data used to train the machine learning model 122 can include a set of records, each of which specifies a sequence D1 of one or more data item identifiers, and a data item identifier D2, which identifies a data item that was accessed subsequently to D1. D2 may be the next data item accessed after D2 in the historical data access pattern, for example. The machine learning model 122 can be trained to generate one or more predicted data items 140 from a sequence of one or more data accesses represented by requested data items 108, where each of the predicted data items 140 is associated with a respective probability 142 generated by the machine learning model 122. The probability indicates a likelihood that the associated predicted data item 140 will be accessed subsequent to the sequence of requested data items 108. The data access prediction generator 120 can use any suitable machine learning model 120 or heuristic model, such as a Linear Regression, Bayes, Random Forest, Support Vector Classifier, Decision Tree, Gradient Boosted Tree, K-Nearest Neighbors model, or the like. The model can be implemented by one or more neural networks. A neural network can include a set of nodes and connections between the nodes. The connections can be modeled as weights between the nodes. Larger weight values can represent stronger connections than smaller weight values. Each node can receive one or more inputs from other nodes to which the node is connected. For each node, each input can be multiplied the weight of the respective connection, and the resulting products can be summed to generate an output. The output can be modified by an activation function, which can map the output to a particular range of values, for example. A neural network can be trained using a training process that determines appropriate weights between the nodes based on training data. The training data set is labeled, e.g., by associating a data item D2 with each data item (or sequence of data items) D1 that was accessed in an access pattern that occurred in the past. The training process involves computing a response of the neural network for an element of training data (e.g., D1), comparing it with the corresponding label (e.g., D2), back-propagating the error, and adjusting weight coefficients in a way that is expected to reduce the error. The training data can be, for example, the sequence of (D1, D2) pairs described above. The training process can thus update the neural network or other machine learning model to reflect that data item D2 was accessed subsequent to data item D1.

Since the prediction can be for a future access of one data item, one of the predicted data items 140 is expected to be accessed, and the other data items 140 in the group of predictions 124 are not expected to be accessed in the future access of one data item. Thus, the data items 140 identified in the predictions 124 can be alternatives, of which one is expected to be accessed. For example, if one of the data items 140 is associated with a highest probability 142 that is greater than the probabilities of the other data items 140 in the group of predictions 124, then the data item 140 having the highest probability is most likely to be the next data item accessed. As another example, if each of the data items 140 is associated with the same probability, such as two data items each having 50% probability, then each data item is equally likely to be the next data item accessed. As mentioned above, the predictions 124 can identify the predicted data items 140. Accordingly, the machine learning model 122 can generate data item identifiers that represent the predicted data items 140, and does not necessarily generate the values of the data items.

As an example, each of the data items identified by the input to the machine learning model 122 can be a file or a directory. The model 122 can be trained on data that specifies sequences of accesses to directories and files. The particular directories and files access, and the order in which they are accessed, form an access pattern. The trained model 122 can generate predictions 124 according to the access patterns specified in the training data. An application can, for example, request data items in access patterns in which an access of a directory is followed by accesses of several files in the directory.

Thus, if a user accesses file B subsequently to file A, then there is a sequential access pattern (file A, file B). The machine learning model 122 can use the access pattern to predict that if file A is accessed, then file B is likely to be accessed next. As an example, the access patterns in the training data may specify that file B is the next file accessed after file A in 50% of the recorded accesses, and file C is the next file accessed after file A in 45% of the recorded accesses. Then, if the machine learning model 122 generates predictions 124 based on input that specifies file A, the predictions 124 can include file B as a data item 140A with a probability 142A of 50%, and file C as a data item 140C with a probability of 45%.

Accessed data items are not necessarily files, and can be other types of data, such as web pages identified by URLs, disk blocks identified by block numbers, directories identified by path names, or other data objects. For example, image files F1 and F2 may be opened in sequential order in a photo editor application on several occasions. If this access pattern is included in training data for the data access prediction generator 120, then the data access prediction generator 120 can generate a predictions 124 specifying file F2 in response to receiving a request for file F1. As another example, an anti-virus scanner can access each file F1 through F20 in a directory D1. The accesses can be represented in training data as files F1 through F20 in sequential order. Over time, after being trained on using numerous file access histories, the data access prediction generator 120 can classify the accesses into clusters. The data access prediction generator 120 can then generate predictions 124 that each file F1 through F20 will be accessed in sequential order subsequently to an access of D1. The data access prediction generator 120 can also learn that if two files in a directory are accessed, then a third file in the directory is likely to be accessed. Another access pattern may indicate that in each access in a directory tends to be a small portion of a file in the directory. The data access prediction generator 120 can then predict that a small portion of each file (e.g., particular blocks) is likely to be accessed. Alternatively, if or each access in a directory tends to be of an entire file, then the data access prediction generator 120 can predict that each block of each file is likely to be accessed, and generate predictions 124 that specify each block of each file as a data item 140, or, alternatively, each file as a data item 140.

The cache manager 110 can use a prediction filter 126 to determine, for each data item prediction 124, whether to pre-load a data item identified by the data item prediction 124 into a cache memory 134 at a server 104 on which the data item is located. The determination can be made using the predicted access probability 142 of the identified data item 140 and/or server characteristics 128, such as an amount of load on the server on which the identified data item 240 is located.

The cache manager 110 can use the prediction filter 126 to generate a cacheable data item group 130 by selecting one or more of the predicted data items 140 that satisfy filtering criteria. The cacheable data item group 130 can include one or more data items that are to be stored in the cache memory 134. If the cacheable data item group 130 includes two or more data items, then the data items in the group 130 can be alternatives, of which one is expected to be accessed (similarly to the group of data items in the predictions 124). Further, similarly to the predictions 124, the cacheable data item group 130 can identify data items, e.g., using data item identifiers, and does not necessarily include the values of the data items. Thus, the cacheable data item group 130 can include one or more of the predicted data items 140 that satisfy the filtering criteria evaluated by the prediction filter 126. For example, if the predictions 124 include data items 140A, 140B, and 140C, and items 140A and 140C satisfy the filtering criteria, but item 140B does not, then the cacheable data item group 130 can identify items 140A and 140C.

The filtering criteria can include a probability criterion for the probability values 142 associated with the data items 140 and/or a server characteristic criterion for server characteristics 128. For example, the prediction filter 126 can select each data item 140 that has a respective probability 142 of at least a threshold probability value and is located on a server computing device 104 having a computational load less than a threshold load value. The computational load of each server computing device 104 can be specified by the server characteristics 128. The evaluation of criteria by the prediction filter 126 is described in further detail below with respect to FIG. 2.

Alternatively or additionally, the data access prediction generator 120 can receive a threshold probability criterion as an input, in which case the cache manager 110 can generate predictions 124 for which the probabilities 142 satisfy the threshold probability criterion input. The probability criterion input can be a threshold minimum probability, for example, in which case the data access prediction generator 120 does not include predicted data items 140 having probabilities 142 less than the threshold minimum in the predictions 124. If the data access prediction generator 120 evaluates the probability criterion in this way, then the prediction filter 126 need not evaluate the probability criterion, since the predictions 124 satisfy the probability criterion.

The prefetch manager 116 can cause the data items identified by the cacheable data item group 130 to be stored in the cache memory 134 as a cacheable data item group 138 (arrow 132). An group association that identifies cacheable data items in the group 130 can be stored in the cache memory 134 or in other memory of the server computing device 104 (e.g., non-cache random access memory or persistent storage). The stored group association can subsequently be used to identify cached data items that are in the same group as a particular cached data item. For example, upon receiving as request for a cached data item 140A, the cache manager 110 can retrieve the cached data item 140A and purge the other data items in the group, such as data item 140C, from the cache. Since the cacheable data item group 138 contains alternative predicted data items 140, and data item 140A is the alternative that is actually accessed, the other data items in the group 138, e.g., data item 140C, can be deleted from the cache. In other examples, two or more of the alternative data items in the group 138 can remain in the cache after one of the data items is accessed. For example, each of the data items 140 in the group 138 that has an associated access probability greater than a threshold value can be retained. Each of the data items 136, 140 can remain in the cache memory 134 until deleted by the prefetch manager 116 or by another component of the cache manager 110, such as an eviction component that deletes cache entries according to an eviction policy (e.g., least recently used cache items can deleted).

The cached data sender 150 can send requested data items that are present in the cache memory 134 to the client computing device 102 (arrow 152). For example, the cached data sender 150 can retrieve and send data items 108A and 108B to the client computing device 102 (arrow 152). Further, although not shown, requested data items that are not in the cache memory 134 can be retrieved from other storage, e.g., persistent storage of the server computing device 104, and sent to the client computing device 102 by the server computing device 104.

Figure 2:
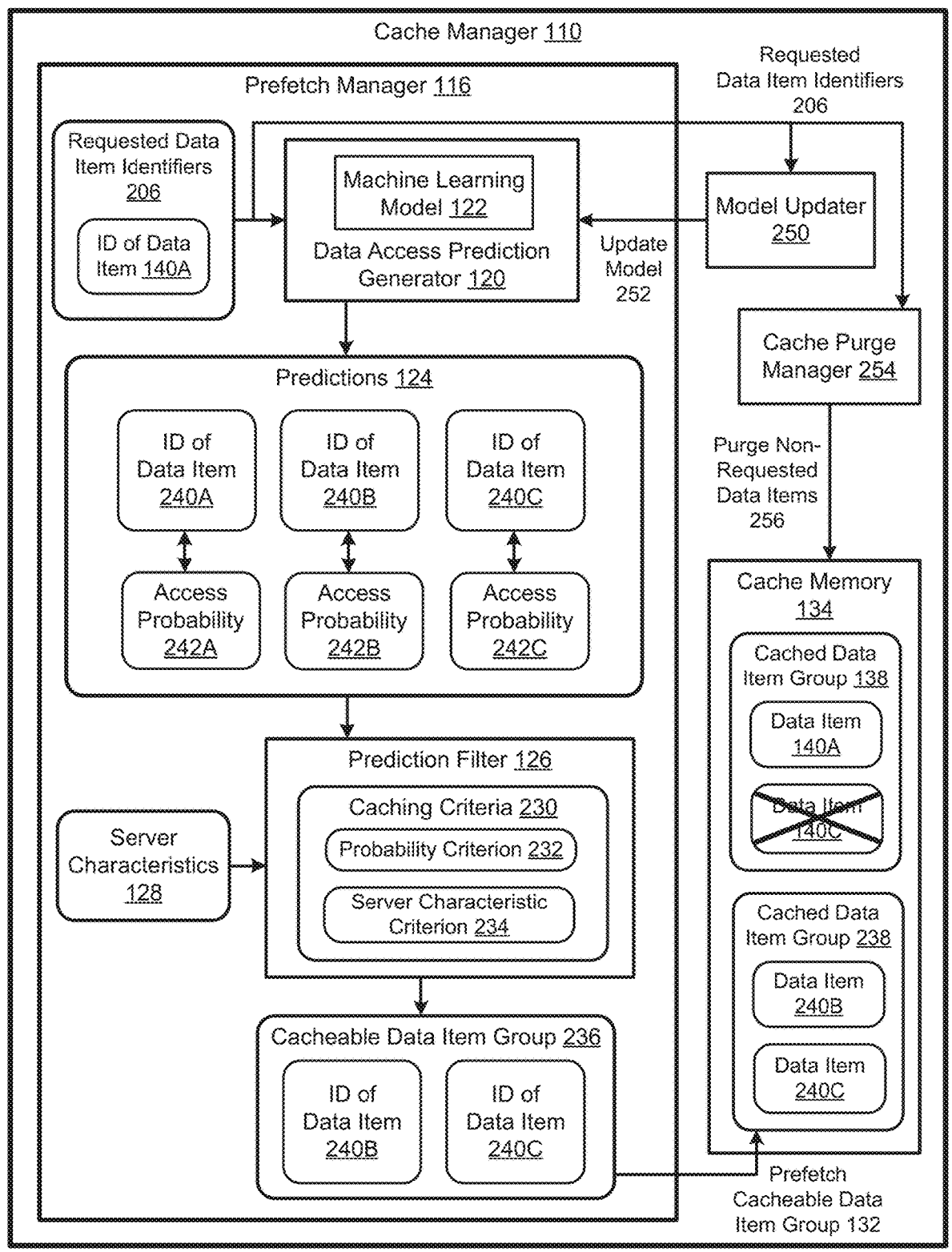
FIG. 2 depicts a high-level block diagram of a cache manager that predicts data items that are likely to be accessed and pre-loads a cache with one or more of the predicted data items, in accordance with one or more aspects of the present disclosure.

FIG. 2 depicts a high-level block diagram of a cache manager that predicts data items that are likely to be accessed and pre-loads a cache with one or more of the predicted data items, in accordance with one or more aspects of the present disclosure. FIG. 2 illustrates operations that can be performed upon receiving a request for a cached data item that was prefetched into the cache memory 134 by the cache manager 110. The operations that can be performed upon receiving a request for a previously prefetched cached data item include purging non-requested data items in the same group as the requested data item from the cache memory.

As described above with reference to FIG. 1, a cache manager 110 can use a data access prediction generator 120, such as a machine learning model 122, to generate multiple alternative predictions 124, each of which identifies a data item 240 that is expected to be accessed by a server computing device 104. The cache manager 110 can cause the server computing device 104 to preload each of the predicted data items 240 that satisfies a prediction filter 126 into a cache memory 134. The cache manager 110 can generate an access probability 242 for each of the predicted alternative data items. Each access probability can represent a likelihood that the respective predicted data item will be a next data item requested from or accessed by the server computing device 104. Each of the data access predictions 124 can includes a predicted data item identifier 240 and an access probability 242 that the data item identified by the predicted data item identifier 140 will be accessed.

The prediction filter 126 can use caching criteria 230, which can include a probability criterion 232 and a server characteristic criterion 234. The caching criteria 230 can be satisfied if the probability criterion 232 and/or the server characteristic criterion 234 are satisfied. The probability criterion 232 can include a threshold probability value, in which case the probability criterion 232 can be satisfied by each data item 240 that has a respective access probability 242 of at least the threshold probability value. As another example, the probability criteria can be satisfied by each data item 240 that is one of a threshold number T of predicted data items having the T highest respective access probabilities in a group of predicted data items 240.

As an example, the probability criteria can specify that up to three data items 240, having the top three highest access probabilities 242 in a predicted group of data items, are to be prefetched. The cache manager 110 can cause a data item 240 to be prefetched by storing an identifier of the data item 240 in a cacheable data item group 236. The cache manager 110 causes each data item 240 identified in the cacheable data item group 236 to be prefetched into cache memory 134 (arrow 132). In this example, the cache manager 110 can identify a group of three data items to be prefetched, each having a respective access probability. If each identified data item is located at a respective server computing device 104, the cache manager 110 can determine whether to prefetch each identified data item 240 in accordance with the data item's access probability 242 and an amount of load on the data item's server 104. In one example, each identified data item can be prefetched if the data item has one of the top three access probabilities in a group of data items, and the load on the data item's respective server 104 is less than a predetermined load threshold.

The server characteristic criterion 234 can include a threshold server load value, in which case the server characteristic criterion 234 can be satisfied if the computational load of a server computing device 104 on which the data item 240 is located is less than a threshold load value. The computational load of each server computing device 104 can be specified by the server characteristics 128. The server load may be, for example, an average number of tasks, processes, or other operations performed by the server 104 at the current time or over a period of time, or other indication of an amount of processing being performed by the server 104.

In another example, the cache manager 110 can calculate a weight value for each data item 240 in accordance with the access probability 242 of the data item 240 and the respective server load, and use the weight value to determine whether to prefetch the data item 240. The weight of a data item 240 can be calculated by dividing the data item's access probability by the computational load of the server 104 on which the data item is located. Data items having weights of at least a threshold value can be included in the cacheable data item group 236 to be prefetched. The weight can thus increase as access probability increases, and decrease as server load increases. The cache manager 110 can include a data item in the cacheable data item group 236 to be prefetched if the data item's weight satisfies a threshold condition, e.g., is greater than a threshold weight value.

In one example, the cache manager 110 can perform less prefetching on heavily-loaded servers 104. For example, if the average load on a server 104 over a 1 second time period is low, e.g., 10%, which satisfies the server characteristic criterion 234, and the access probability 242 of a predicted data item 240 is 40%, which satisfies the probability criterion 232, then the cache manager 110 can prefetch the predicted data item 240. As another example, if the load is low, e.g., 10%, which satisfies the server characteristic criterion 234, and the probability of access of the data item is high, e.g., 90%, then the cache manager can prefetch the data item. As another example, if a server 104 is heavily loaded (e.g., has a load of 90%), but the probability 242 associated with the predicted data item 240 is high (e.g., 85%), then the prefetch manager 116 can prefetch the predicted data item 140 despite the heavy load on the server 104.

As shown in FIG. 2, the prefetch manager 116 receives a data item request 206 that identifies data item 140A as a requested data item. Data item 140A was prefetched into cache memory 134 as described above with respect to FIG. 1. Upon receiving a request for a prefetched data item, the cache manager 110 can purge non-requested data items in the same group as the requested data item from the cache memory 134. A model updater 250 can update a model in the data access prediction generator 120 to reflect that an access request (e.g., a read request) for the data item 140A has been received (arrow 252). The model can be updated with the sequence (D1, D2), where data item D2 was received subsequent to D1. For example, D2 was the next data item received after D1. In this example, D1 is data item 108B (received in FIG. 1), and D2 is data item 140B (received in FIG. 2). Updating the model with the relation (D1, D2) in this way can, for example, increase weight values in the model that represent the relation (D1, D2) and increase the probability of predicting that D2 will be received subsequent to D1.

The model updater 250 can also update the model in the data access prediction generator 120 to reflect that another data item D3 in same group 138 as D2, e.g., data item 140C, was not received subsequent to D1. Updating the model with the relation (D1, not D3) in this way can, for example, decrease weight values in the model that represent the relation (D1, D3) and decrease the probability of predicting that D3 will be received subsequent to D1.

Upon receiving a request for reading a prefetched data item 140A, a cache purge manager 254 can purge non-requested data items 140C in the same cached data item group 138 as the requested data item 140A from the cache memory 134. The cache purge manager 254 receives the requested data item identifiers 206 and identifies the other data items in the cacheable data item group 138 that contains or is associated with each requested data item identifier 140. For example, the cache purge manager 254 can retrieve, from cache memory or other memory of the server computing device 104, a group association that includes the identifier of the data item 140A. The group association can be stored by the prefetch manager 116 as described above with reference to FIG. 1. The group association specifies the identifiers of the other data items in the group, such as data item 140C. The cache purge manager 254 can remove each of the other data items in the group from cache memory 134 (arrow 256). In this example, the cached data item 140C is removed from cache memory 134. If any of the other data items in the group have been sent to but are not yet stored in the cache memory 134 (e.g., if the cache memory 134 for the other data item is located at a different server computing device 104), then the cache purge manager 254 can send an instruction to the cache memory 134 indicating that the other data item is not to be stored in the cache.

Figure 3:
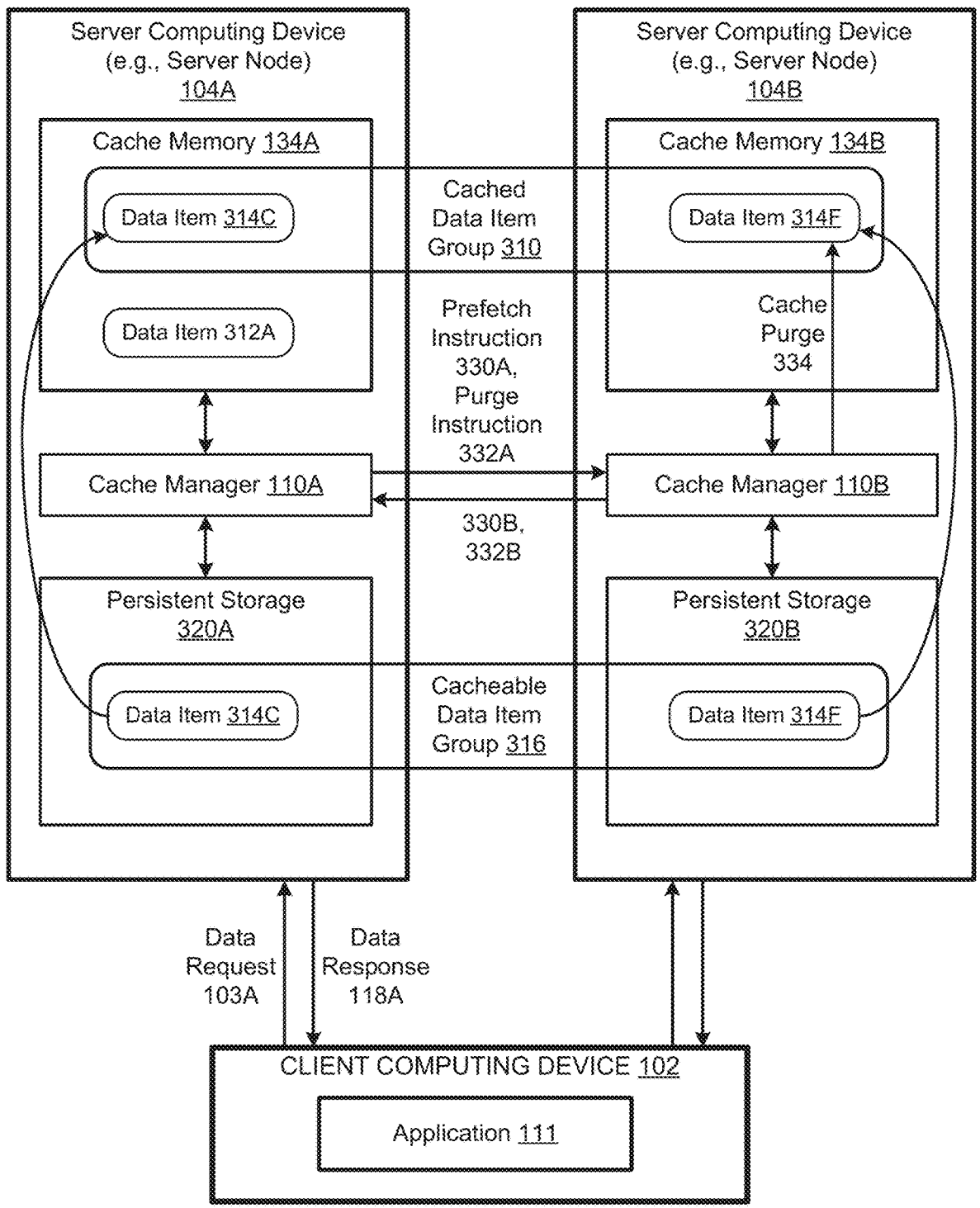
FIG. 3 depicts a high-level block diagram of a computing system in which a cache manager on a first server sends prefetch commands to a second server to cause the second server to prefetch predicted data items located on persistent storage at the second server, in accordance with one or more aspects of the present disclosure.

FIG. 3 depicts a high-level block diagram of a computing system 300 in which a cache manager 110A on a first server 104A sends prefetch instructions 330A to a second server 104B to cause the second server 104B to prefetch predicted data items 314 located on persistent storage 320B at the second server 104B, in accordance with one or more aspects of the present disclosure. A data item 314 that is located at a server computing device 104 can be present (e.g., stored) in persistent storage 320 of the server computing device 104. Different data items 314 can be stored at different servers 104 in a distributed storage system using techniques such as database sharding. For example, database sharing can involve partitioning a database table's into multiple tables, and storing each table in persistent storage 320 of a different server computing device 104. Each server computing device 104 can have a different cache memory 134, persistent storage 320, cacheable data item group(s) 316 (stored in the persistent storage 320), cache manager 110, cached data item group(s) 310 (e.g., cacheable data item group(s) that are stored in the cache memory 134), for example.

The cache managers 110 on different server computing devices 104 can communicate with each other to prefetch data into the cache 134 and/or purge data from the cache 134, and/or update a model in the data access prediction generator 120 on the server computing device 104 at which the data 314 is located. The cache managers 110 can communicate with each other by sending prefetch instructions and/or purge instructions, and/or model update instructions to each other via a computer network.

Upon identifying a group 316 of cacheable data items to prefetch, the cache manager 110 can cause each predicted data item 314 in the group 316 to be pre-cached in cache memory 134 at the respective server 104 on which the predicted data item 314 is located. The cache manager 110 can send, for each of the cacheable data items, to the respective storage server 104 at which the cacheable data item 314 is located, a request to store the cacheable data item in a portion of the cache memory that is located at the respective storage server 104. The request to store can be, for example, a prefetch instruction 330. The prefetch instruction 330 can cause the respective server 104 to load the predicted data item 314 from persistent storage 320 and store the predicted data item 314 in a cache memory 134 at the server 104 as a pre-cached data item 312.

Upon receiving a request for a cacheable data item 314C in a group 310, the cache manager 110 can remove each of the other cacheable data items 314F that have not been requested from the cache memory 134. The cache manager 110 can remove each of the other cacheable data items from the cache memory 134 by sending, for each of the other cacheable data items, to a respective second storage server 104B at which the other cacheable data item is located, a request to remove the other cacheable data item from a portion of the cache memory 134 located at the second storage server (e.g., cache memory 134B in the case of data item 314F). The request to remove can be, for example, a purge instruction 332.

As shown in FIG. 3, when one of the pre-cached data items 314C is requested by a client 102 (arrow 103A), the cache manager 110 can send a purge instruction 332 to each server 104 on which one of the other (alternative) predicted but non-requested data items in a cached data item group 310 that includes the requested data item 312 is located. The purge instruction 332 can cause the server 104 to delete the non-requested data item from the server's cache memory 134. The purge instruction (or a separate model update instruction sent upon receiving a request for a pre-cached data item) can also cause a cache manager 110 located at the server computing device 104 to update the machine learning model 122 located at the server computing device 104 to reflect that the requested data item 312 has been requested/accessed, and the non-requested data item has not been requested/accessed. Updating the machine learning model 122 to reflect requested and/or non-requested data items is described above with reference to FIG. 2.

As an example, suppose that server computing device 104A receives a request for data item 312A (arrow 103). The cache manager 110A located at server 104A can retrieve data item 312A from cache memory 134A and send data item 312A in a response to the request (arrow 118A). Further, the cache manager 110A can invoke the data access prediction generator 120 using the data item 312A as input. The data access prediction generator 120 can generate a prediction indicating that data items 314C and 314F are likely to be requested subsequently to data item 312A (e.g., with probabilities 30% and 20%, respectively). Accordingly, data items 314C and 314F form a cacheable data item group 316. Each data item in the group 316 is predicted, with a respective probability, to be the next data item to be accessed subsequent to the access pattern that includes data item 312A. Thus, each predicted data item 314C, 314F in the group is one of group of alternatives for the next data item that is predicted to be accessed. If one of the data items in the group is subsequently accessed, then the alternatives, which are not accessed, can be treated as incorrect predictions. Thus, the alternatives can be purged from the cache The cache manager 110A can cause predicted data item 314C to be pre-cached (e.g., stored) in cache memory 134A from persistent storage 320A, as shown by the arrow from data item 314C in persistent storage 320A to data item 314C in cache memory 134A. However, predicted data item 314F is located on a different server computing device (e.g., a different server node). Thus, the cache manager 110A on server 104A sends a prefetch instruction 330A to server device 104B instructing server device 104B to prefetch data item 314F from persistent storage 320B. The cache manager 110B on server 104B receives the prefetch instruction 330A and causes data item 314F to be stored in cache memory 134B from persistent storage 320B on server 104B, as shown by the arrow from data item 314F in persistent storage 320B to data item 314F in cache memory 134B. Thus, data items 314C and 314F are both stored in cache memory 134 and form a cached data item group 310.

In another example, data item 314C and data item 314F have been pre-cached on servers 104A and 104B, respectively, as described above, and are thus stored in cache memories 134A and 134B, respectively. Data items 314C and 314F form a cached data item group, since they are alternatives in a group generated by the data access prediction generator 120 (e.g., are predicted to be accessed subsequent to data item 312A with probabilities 30% and 20%, respectively). Suppose that server 104A receives a request for data item 314C (arrow 103A). The cache manager 110A on server 104A causes data item 314C to be sent in a response (arrow 118A).

However, data item 314F is in the same cached data item group 310 as data item 314C. Data item 314F is stored in cache memory 134B (as described above), but is the non-requested alternative to the requested data item 314C that was predicted in the same group by the data access prediction generator 120. Thus, data item 314F should be purged from cache memory 134B. Since cache memory 134B is on a different server 104B, the cache manager 110A on server 104A sends a purge instruction 332A to the cache manager 110B on server 104B. The cache manager 110B receives the purge instruction 332A and removes data item 314F from cache memory 134B (arrow 334), as described above with respect to the cache purge manager 254.

Further, the cache manager 110A can update the machine learning model 122 on server 104A to reflect that data item 314C was requested and data item 314F was not requested after receiving data item 312A, as described above with respect to the model updater 250. The cache manager 110A can also send a model update instruction to one or more other servers, such as server 104B, to cause each of the other servers to update their machine learning model to reflect that data item 314C was requested and data item 314F was not requested after receiving data item 312A. Alternatively or additionally, a single instance of the data access prediction generator 120 can be used. For example, the data access prediction generator 120 can be located on one of the servers or on another computing device, and each of the other servers can send requests for predictions and model update instructions to the data access prediction generator 120. Although a prefetch instruction 330A and a purge instruction 332A sent from server 104A to server 104B are described in the example herein, any of the servers 104 can send a prefetch instruction and/or a purge instruction to another one of the servers 104 as needed. For example, server 104B can send a prefetch instruction 330B and a purge instruction 332B to server 104A.

Figure 4:
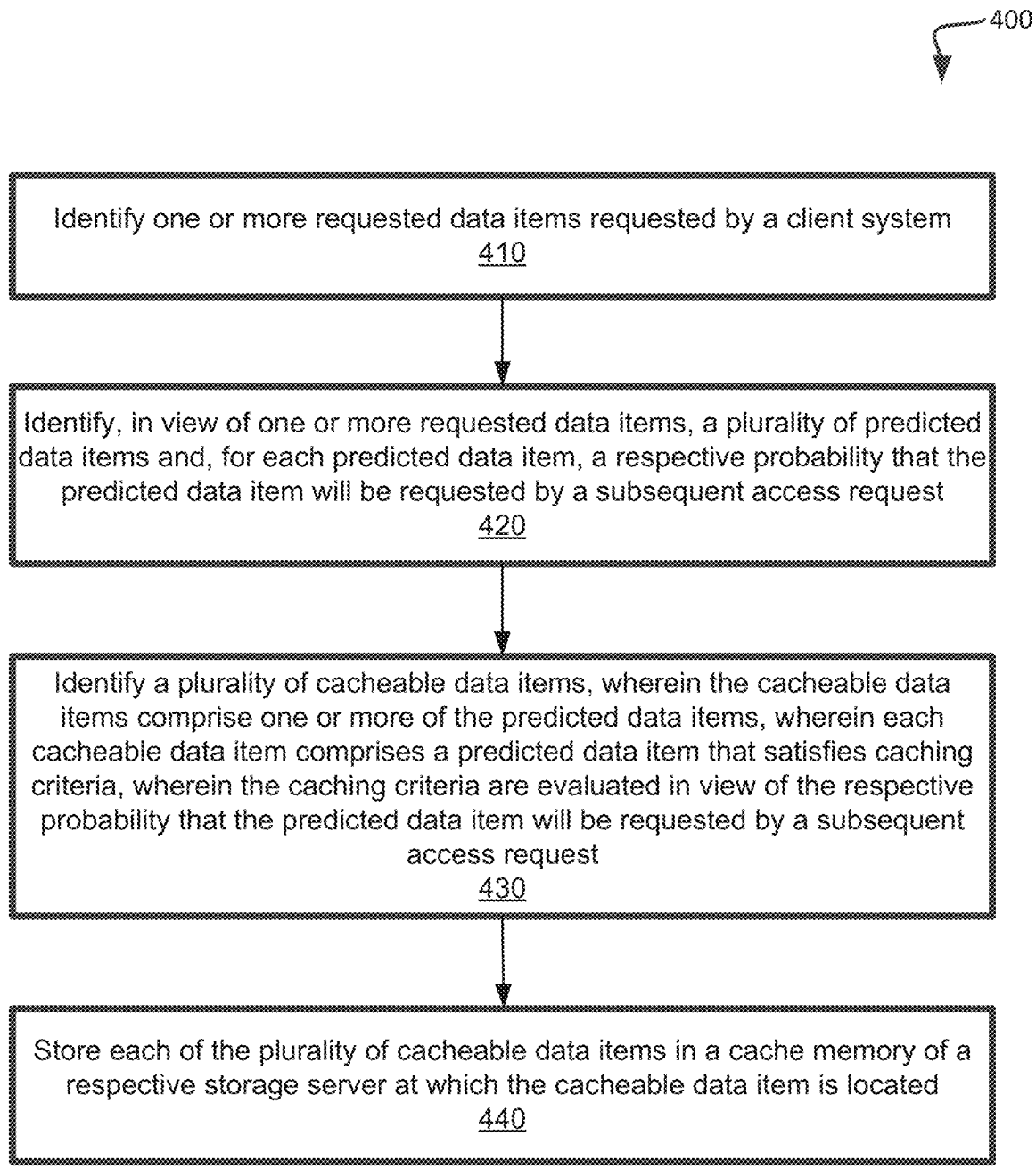
FIG. 4 depicts a flow diagram of an example method for prefetching predicted data items, in accordance with one or more aspects of the present disclosure.

FIG. 4 depicts a flow diagram of an example method 400 for prefetching predicted data items, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a server computing device 104 and/or a client computing device 102 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may begin at block 410. At block 410, a computing device may identify one or more requested data items requested by a client system. At block 420, the computing device may identify, in view of one or more requested data items, a plurality of predicted data items and, for each predicted data item, a respective probability that the predicted data item will be requested by a subsequent access request. The computing device may identify the plurality of predicted data items using a model, such as a machine learning model. The model can further generate, for each predicted data item, the respective probability that the predicted data item will be requested by the subsequent access request.

At block 430, the computing device may identify a plurality of cacheable data items, wherein the cacheable data items comprise one or more of the predicted data items, wherein each cacheable data item comprises a predicted data item that satisfies caching criteria, wherein the caching criteria are evaluated in view of the respective probability that the predicted data item will be requested by a subsequent access request. The subsequent access request may be, for example, the next access request received by the computing device after the request for the requested data items received from the client system. The predicted data item may satisfy the caching criteria if, for example, the respective probability that the predicted data item will be requested by a subsequent access request exceeds a threshold probability value. The caching criteria may be further evaluated in view of one or more characteristics of a storage server at which the predicted data item is stored in persistent storage. The characteristic(s) of the storage server may include a load of the storage server, for example. The load of the storage server can be one or more of a processing load, an input/output load, or a memory load, for example.

In one example, the caching criteria may be satisfied by the predicted data item if the respective access probability of the data item satisfies a probability threshold and the load of the storage server at which the data item is located satisfies a load threshold. In another example, the caching criteria may be satisfied by the predicted data item if the respective access probability of the data item divided by the load of the storage server at which the data item is located satisfies a weight threshold.

At block 440, the computing device may store each of the plurality of cacheable data items in a cache memory of a respective storage server at which the cacheable data item is located. Responsive to completing the operations described herein above with reference to block 440, the method may terminate.

Figure 5:
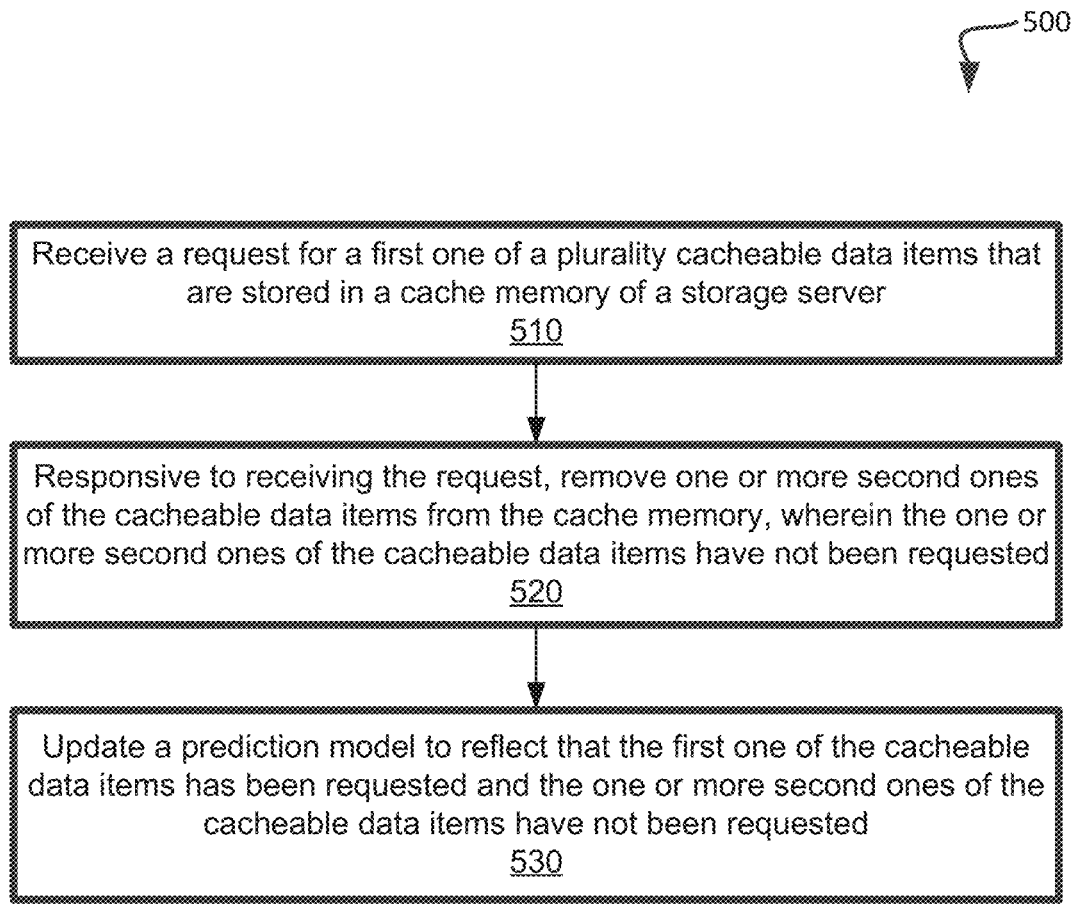
FIG. 5 depicts a flow diagram of an example method for updating a prediction model and purging alternative prefetched data items upon receiving a request for one of a plurality of previously-predicted data items, in accordance with one or more aspects of the present disclosure.

FIG. 5 depicts a flow diagram of an example method 500 for updating a prediction model and purging alternative prefetched data items upon receiving a request for one of a plurality of previously-predicted data items, in accordance with one or more aspects of the present disclosure. Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a server computing device 104 and/or a client computing device 102 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may begin at block 510. At block 510, a computing device may receive a request for a first one of a plurality cacheable data items that are stored in a cache memory of a storage server. At block 520, the computing device may, responsive to receiving the request, remove one or more second ones of the cacheable data items from the cache memory, wherein the one or more second ones of the cacheable data items have not been requested. At block 530, the computing device may update a prediction model, such as a machine learning model, to reflect that the first one of the cacheable data items has been requested and the one or more second ones of the cacheable data items have not been requested. Responsive to completing the operations described herein above with reference to block 540, the method may terminate.

Figure 6:
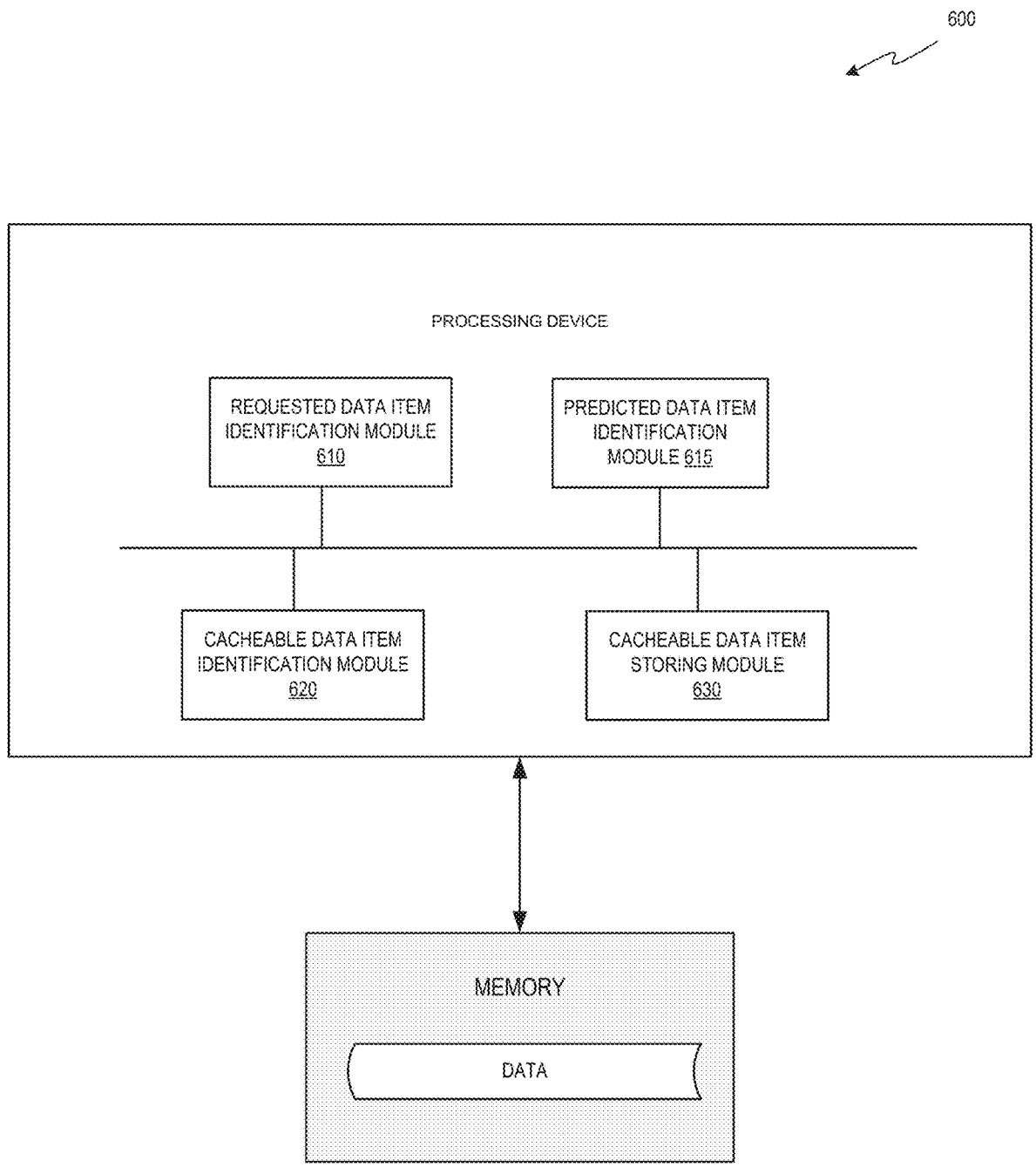
FIG. 6 depicts a block diagram of an example computer system in accordance with one or more aspects of the present disclosure.

FIG. 6 depicts a block diagram of a computer system 600 operating in accordance with one or more aspects of the present disclosure. Computer system 600 may be the same or similar to client computing device 102 and/or server computing device 104 of FIG. 1, and may include one or more processors and one or more memory devices. In the example shown, computer system 600 may include a requested data item identification module 610, a predicted data item identification module 615, a cacheable data item identification module 620, and a cacheable data item storing module 630.

Requested data item identification module 610 may enable a processor to identify one or more requested data items requested by a client system. Predicted data item identification module 615 may enable the processor to identify, in view of one or more requested data items, a plurality of predicted data items and, for each predicted data item, a respective probability that the predicted data item will be requested by a subsequent access request. The computing device may identify the plurality of predicted data items using a prediction model, such as a machine learning model. The model can further generate, for each predicted data item, the respective probability that the predicted data item will be requested by the subsequent access request.

Cacheable data item identification module 620 may enable the processor to identify a plurality of cacheable data items, wherein the cacheable data items comprise one or more of the predicted data items, wherein each cacheable data item comprises a predicted data item that satisfies caching criteria, wherein the caching criteria are evaluated in view of the respective probability that the predicted data item will be requested. The predicted data item may satisfy the caching criteria if the respective probability that the predicted data item will be requested exceeds a threshold probability value. The caching criteria may be further evaluated in view of one or more characteristics of a storage server at which the predicted data item is stored in persistent storage. The characteristics of the storage server may include a load of the storage server at which the data item is located, for example. The load of the storage server can be one or more of a processing load, an input/output load, or a memory load, for example. A load can be based on an quantity of operations performed over a defined amount time. For example, a processing load can be a percentage of processing capacity that was used (e.g., non-idle) over the past 10 seconds, 1 minute, 10 minutes, or other period of time. An input/output load can be a percentage of input/output bandwidth capacity that was used over a period of time, and a memory load can be an amount of memory space or bandwidth capacity that was used over a period of time.

Cacheable data item storing module 630 may enable the processor to store each of the plurality of cacheable data items in a cache memory of a respective storage server at which the cacheable data item is located. Storing the plurality of cacheable data items in the cache memory of the storage server may include sending, for each of the cacheable data items, to a respective storage server node at which the cacheable data item is stored in a persistent storage, a request to store the cacheable data item in a portion of the cache memory that is located at the respective storage server.

Figure 7:
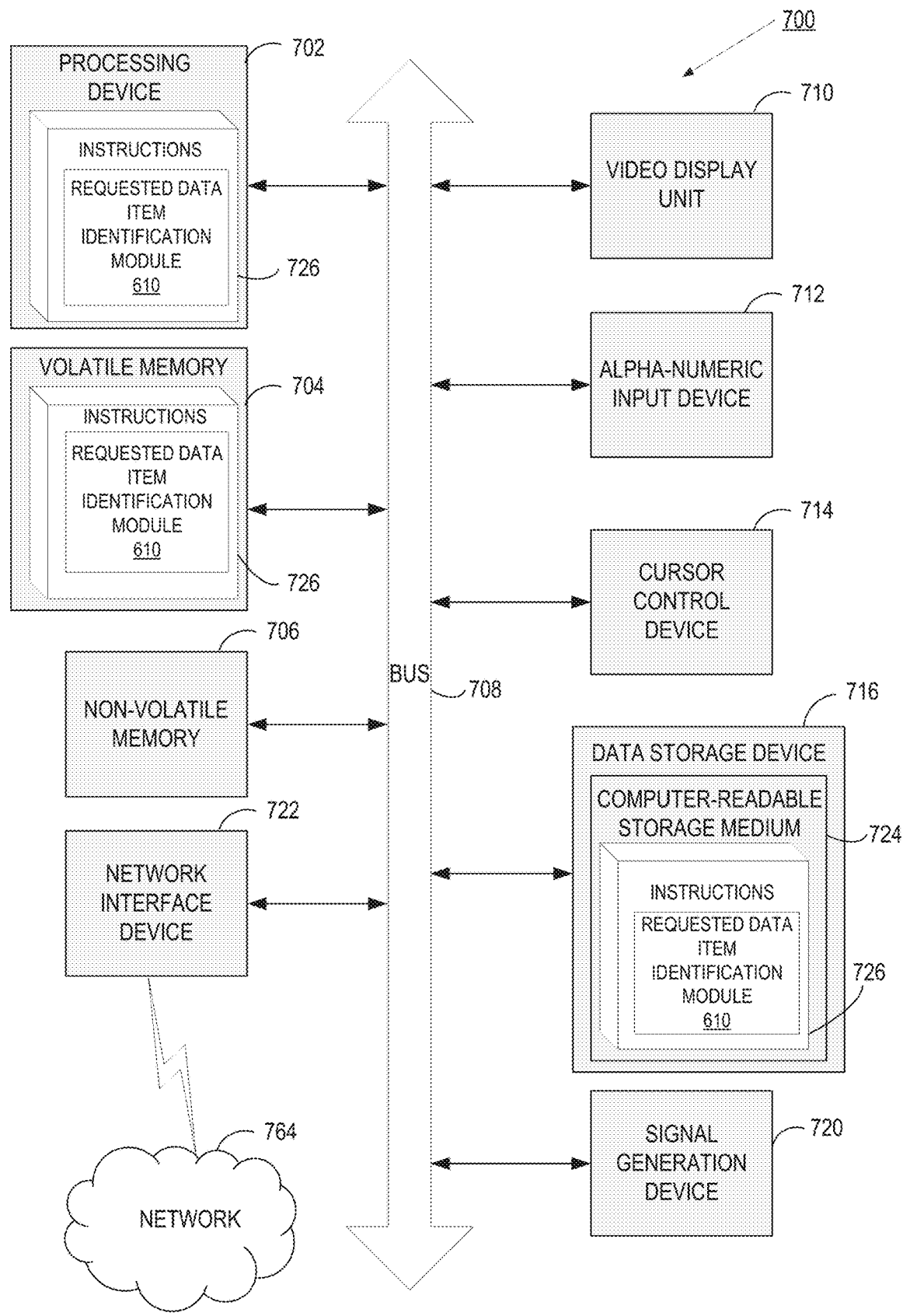
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to client computing device 102 or server computing device 104 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 400 or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
identifying, by a computing device, one or more requested data items requested by a client system;
identifying, in view of the one or more requested data items, a plurality of predicted data items and, for each predicted data item, a respective probability that a predicted data item of the plurality of predicted data items will be requested by a subsequent access request;
identifying a plurality of cacheable data items, wherein the plurality of cacheable data items comprise one or more of the plurality of predicted data items, wherein each cacheable data item comprises the predicted data item that satisfies caching criteria, wherein the caching criteria are evaluated in view of the respective probability that the predicted data item will be requested by the subsequent access request, wherein the predicted data item satisfies the caching criteria if the respective probability that the predicted data item will be requested based on a load of a respective storage server at which the predicted data item is located satisfies a weight threshold; and
storing each of the plurality of cacheable data items in a cache memory of a respective storage server at which the cacheable data item is located.

2. The method of claim 1, wherein the predicted data item satisfies the caching criteria if the respective probability that the predicted data item will be requested by the subsequent access request exceeds a threshold probability value.

3. The method of claim 1, wherein for each of the plurality of predicted data items, the caching criteria are further evaluated in view of one or more characteristics of the respective storage server at which the predicted data item is located.

4. The method of claim 3, wherein the one or more characteristics of the respective storage server comprise the load of the respective storage server.

5. The method of claim 4, wherein the predicted data item satisfies the caching criteria if the respective probability that the predicted data item will be requested satisfies a threshold probability value and the load of the respective storage server at which the predicted data item is located satisfies a load threshold.

6. The method of claim 4, wherein the load comprises one or more of a processing load, an input/output load, or a memory load.

7. The method of claim 4, wherein the predicted data item satisfies the caching criteria if the respective probability that the predicted data item will be requested divided by the load of the respective storage server at which the predicted data item is located satisfies the weight threshold.

8. The method of claim 1, wherein the subsequent access request is a next access request received by the computing device.

9. The method of claim 1, further comprising:
receiving a request for a first one of the plurality of cacheable data items; and
responsive to receiving the request, removing one or more second ones of the plurality of cacheable data items from the cache memory, wherein the one or more second ones of the plurality of cacheable data items have not been requested.

10. The method of claim 9, wherein removing the one or more second ones of the plurality of cacheable data items from the cache memory comprises:
sending, for each of the second ones of the plurality of cacheable data items, to a respective second storage server at which the second one of the plurality of cacheable data items is located, a request to remove the second one of the plurality of cacheable data items from a portion of a cache memory located at the respective second storage server.

11. The method of claim 9, wherein the plurality of predicted data items is identified using a prediction model, wherein the model further generates, for each predicted data item, the respective probability that the predicted data item will be requested by the subsequent access request, the method further comprising:
updating the prediction model to reflect that the first one of the plurality of cacheable data items has been requested and the one or more second ones of the plurality of cacheable data items have not been requested.

12. The method of claim 1, further comprising:
for each of the plurality of cacheable data items, loading the cacheable data item from persistent storage of the respective storage server at which the cacheable data item is located prior to storing the cacheable data item in the cache memory of the respective storage server at which the cacheable data item is located.

13. The method of claim 1, wherein storing each of the plurality of cacheable data items in the cache memory of the respective storage server at which the cacheable data item is located comprises:
sending, for each of the plurality of cacheable data items, to the respective storage server at which the cacheable data item is located, a request to store the cacheable data item in a portion of the cache memory that is located at the respective storage server.

14. A system comprising:
a memory device; and
a first processing device, operatively coupled to the memory device, the first processing device to:
identify one or more requested data items requested by a client system;
identify, in view of the one or more requested data items, a plurality of predicted data items and, for each predicted data item, a respective probability that a predicted data item of the plurality of predicted data items will be requested by a subsequent access request;
identify a plurality of cacheable data items, wherein the plurality of cacheable data items comprise one or more of the plurality of predicted data items, wherein each cacheable data item comprises the predicted data item that satisfies caching criteria, wherein the caching criteria are evaluated in view of the respective probability that the predicted data item will be requested by the subsequent access request, wherein the predicted data item satisfies the caching criteria if the respective probability that the predicted data item will be requested based on a load of a respective storage server at which the predicted data item is located satisfies a weight threshold; and store each of the plurality of cacheable data items in a cache memory of a respective storage server at which the cacheable data item is located.

15. The system of claim 14, wherein the predicted data item satisfies the caching criteria if the respective probability that the predicted data item will be requested by the subsequent access request exceeds a threshold probability value.

16. The system of claim 14, wherein for each of the plurality of predicted data items, the caching criteria are further evaluated in view of one or more characteristics of the respective storage server at which the predicted data item is located.

17. The system of claim 16, wherein the one or more characteristics of the respective storage server comprise the load of the respective storage server.

18. A non-transitory machine-readable storage medium storing instructions that cause a processing device to:
   identify one or more requested data items requested by a client system;
   identify, in view of the one or more requested data items, a plurality of predicted data items and, for each predicted data item, a respective probability that a predicted data item of the plurality of predicted data items will be requested by a subsequent access request;
   identify a plurality of cacheable data items, wherein the plurality of cacheable data items comprise one or more of the plurality of predicted data items, wherein each cacheable data item comprises the predicted data item that satisfies caching criteria, wherein the caching criteria are evaluated in view of the respective probability that the predicted data item will be requested by the subsequent access request, wherein the predicted data item satisfies the caching criteria if the respective probability that the predicted data item will be requested based on a load of a respective storage server at which the predicted data item is located satisfies a weight threshold; and
   store each of the plurality of cacheable data items in a cache memory of a respective storage server at which the cacheable data item is located.

19. The non-transitory machine-readable storage medium of claim 18, wherein the predicted data item satisfies the caching criteria if the respective probability that the predicted data item will be requested by the subsequent access request exceeds a threshold probability value.

20. The non-transitory machine-readable storage medium of claim 18, wherein for each of the plurality of predicted data items, the caching criteria are further evaluated in view of one or more characteristics of the respective storage server at which the predicted data item is located.

* * * * *